US009160744B1

(12) United States Patent
Machani

(10) Patent No.: US 9,160,744 B1
(45) Date of Patent: Oct. 13, 2015

(54) INCREASING ENTROPY FOR PASSWORD AND KEY GENERATION ON A MOBILE DEVICE

(71) Applicant: EMC Corporation, Hopkinton, MA (US)

(72) Inventor: Salah Machani, Thornhill (CA)

(73) Assignee: EMC Corporation, Hopkinton, MA (US)

( * ) Notice: Subject to any disclaimer, the term of this patent is extended or adjusted under 35 U.S.C. 154(b) by 26 days.

(21) Appl. No.: 14/036,498

(22) Filed: Sep. 25, 2013

(51) Int. Cl.
G06F 21/32 (2013.01)
H04L 9/08 (2006.01)
H04L 29/06 (2006.01)
G06F 21/36 (2013.01)

(52) U.S. Cl.
CPC ............ *H04L 63/0861* (2013.01); *G06F 21/32* (2013.01); *G06F 21/36* (2013.01); *H04L 9/0861* (2013.01); *H04L 63/0428* (2013.01)

(58) Field of Classification Search
CPC ....... G06F 21/31; G06F 21/316; G06F 21/36; H04L 63/08; H04L 63/0853; H04L 63/0861
See application file for complete search history.

(56) References Cited

U.S. PATENT DOCUMENTS

| 6,421,453 | B1 | 7/2002 | Kanevsky et al. | |
| 7,434,070 | B2 | 10/2008 | Moitrel et al. | |
| 2005/0138392 | A1* | 6/2005 | Johnson et al. | 713/186 |
| 2006/0015727 | A1* | 1/2006 | Birk et al. | 713/171 |
| 2007/0030963 | A1* | 2/2007 | Wyld et al. | 380/44 |
| 2007/0283416 | A1 | 12/2007 | Renaud | |
| 2008/0091453 | A1* | 4/2008 | Meehan et al. | 705/1 |
| 2010/0186074 | A1 | 7/2010 | Stavrou et al. | |
| 2013/0239191 | A1* | 9/2013 | Bostick | 726/7 |
| 2014/0075547 | A1 | 3/2014 | Kumai | |

OTHER PUBLICATIONS

U.S. Appl. No. 13/927,386, filed Jun. 26, 2013, entitled: Adding Entropy to Key Generation on a Mobile Device.

* cited by examiner

*Primary Examiner* — Gilberto Barron, Jr.
*Assistant Examiner* — Arya Golriz
(74) *Attorney, Agent, or Firm* — Ryan, Mason & Lewis, LLP

(57) ABSTRACT

Methods, apparatus and articles of manufacture for increasing entropy for password and key generation on a mobile device are provided herein. A method includes establishing a pre-determined set of cryptographic information, wherein said pre-determined set of cryptographic information comprises one or more input elements and one or more interface input behavior metrics associated with the one or more input elements; generating a prompt via a computing device interface in connection with an authentication request to access a protected resource associated with the computing device; processing input cryptographic information entered via the computing device interface in response to the prompt against the pre-determined set of cryptographic information; and resolving the authentication request based on said processing.

20 Claims, 11 Drawing Sheets

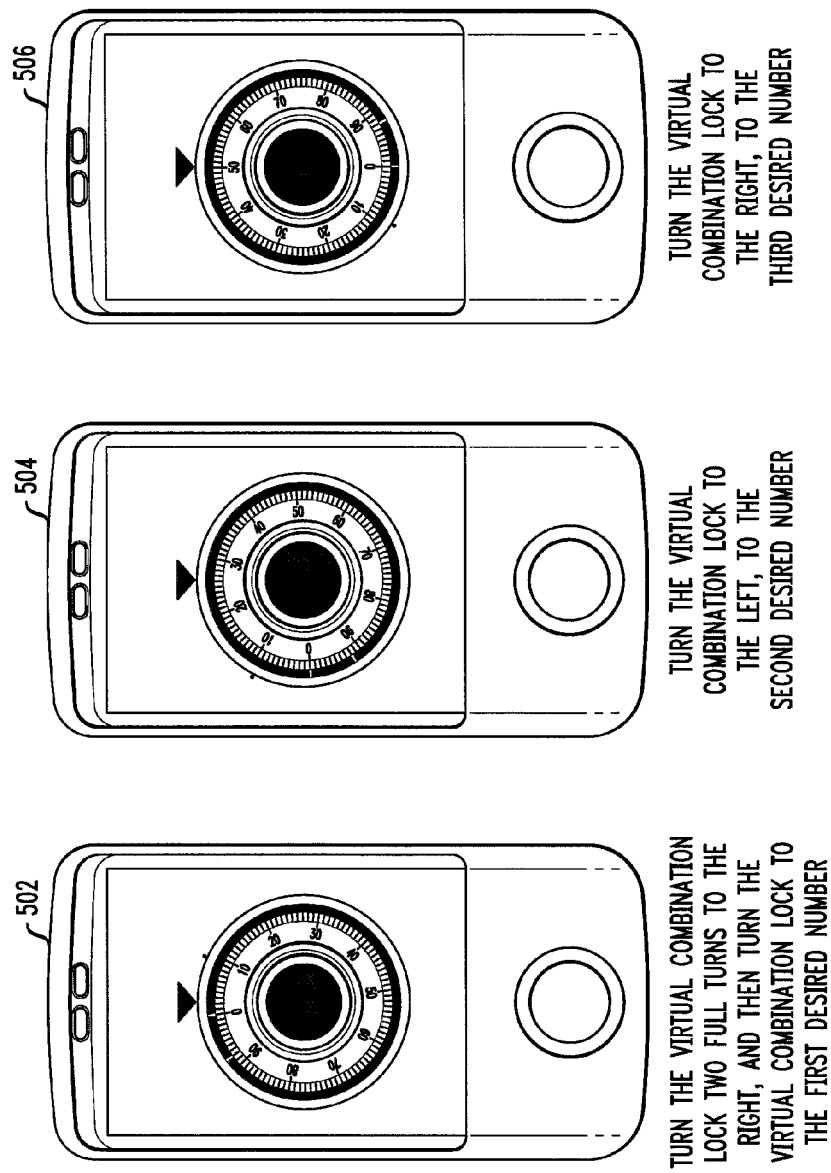

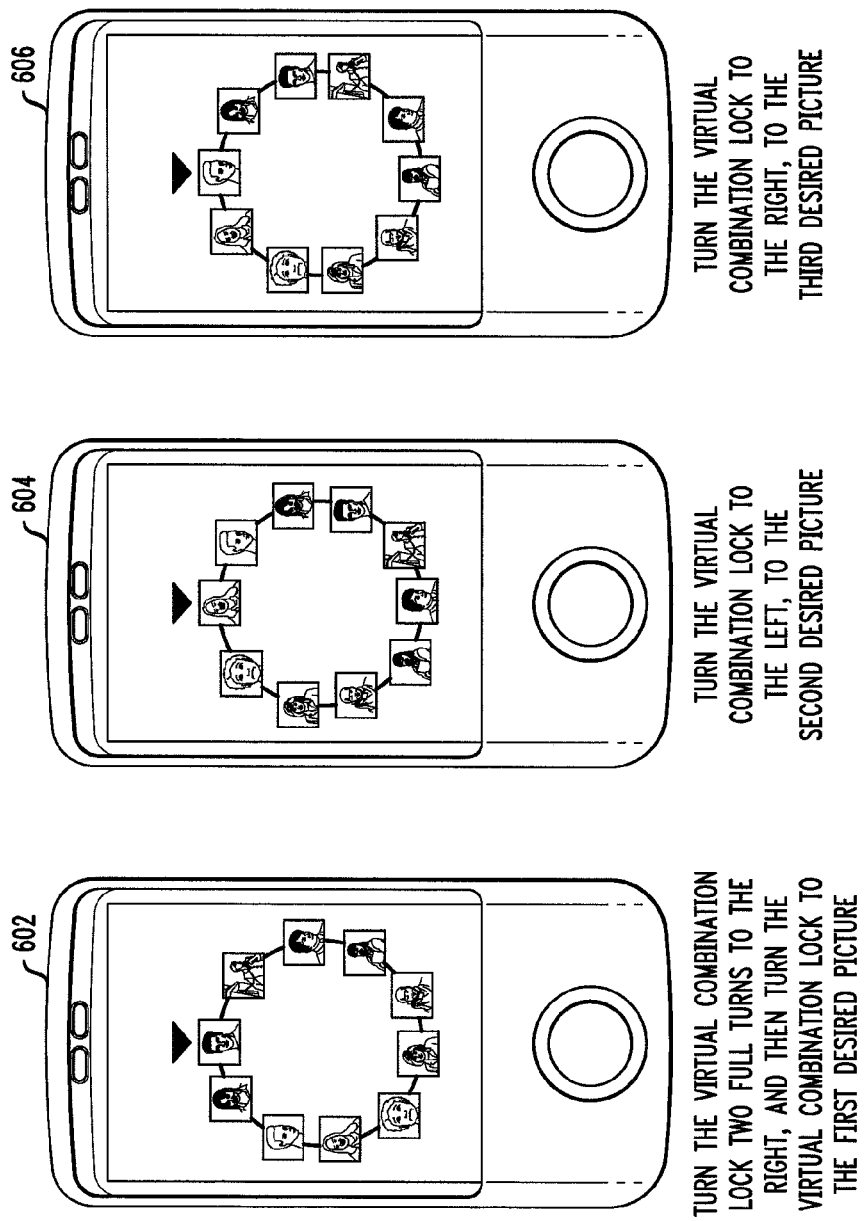

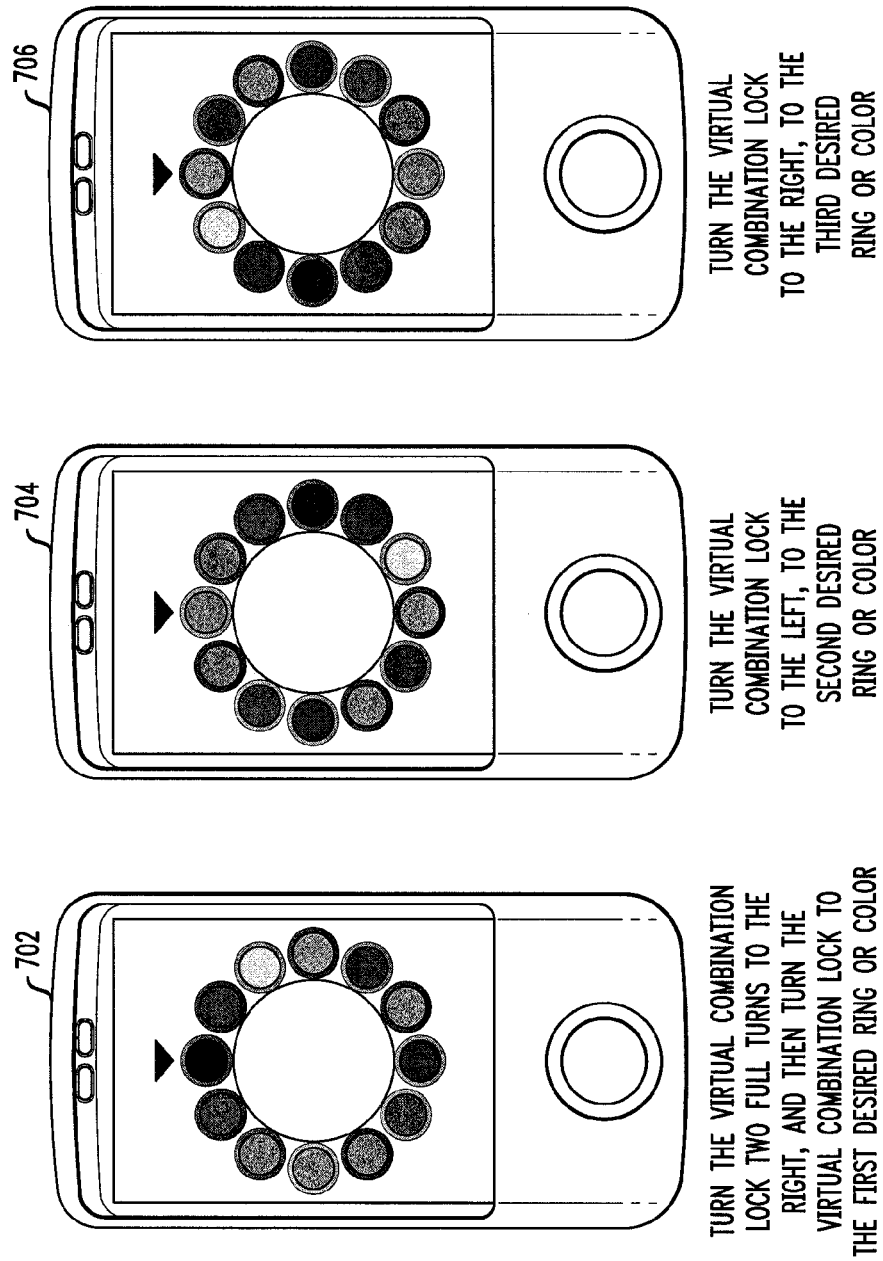

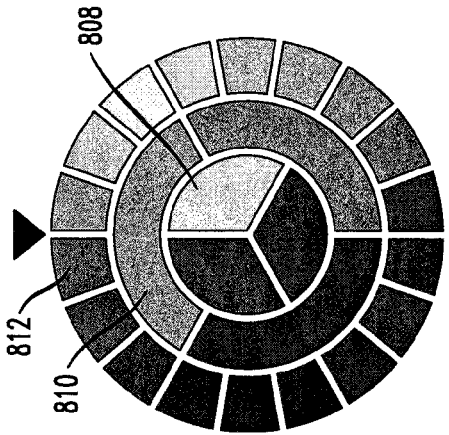

FIG. 8C

TOUCH TO SELECT A DESIRED COLOR FROM THE INNER CIRCLE, AND THEN TOUCH TO SELECT A SECOND DESIRED COLOR FROM THE MIDDLE CIRCLE, AND THEN TURN THE OUTER CIRCLE TWICE TO THE RIGHT OR TWICE TO THE LEFT TO SELECT A THIRD DESIRED COLOR

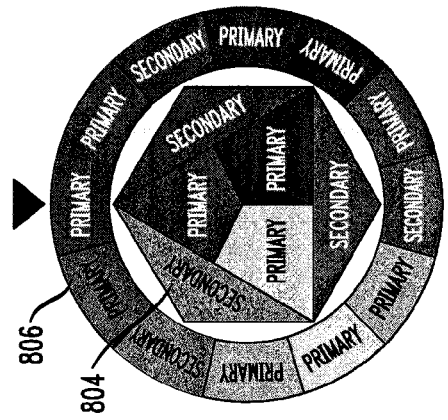

FIG. 8B

TOUCH TO SELECT A DESIRED COLOR FROM THE INNER DIAMOND, AND THEN TURN THE OUTER DIAL TWICE TO THE RIGHT, AND THEN TURN THE DIAL ONCE TO THE LEFT, AND THEN TURN THE DIAL ONCE TO THE RIGHT TO SELECT THREE ADDITIONAL DESIRED COLORS

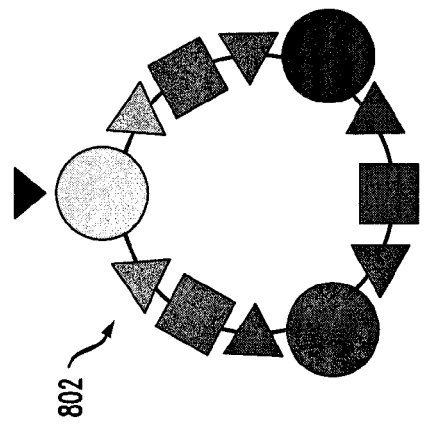

FIG. 8A

TURN THE VIRTUAL COMBINATION LOCK TWO FULL TURNS TO THE RIGHT, AND THEN TURN THE VIRTUAL COMBINATION LOCK ONCE TO THE LEFT, AND THEN TURN THE VIRTUAL COMBINATION LOCK ONCE TO THE RIGHT TO SELECT THREE DESIRED COLORED SHAPES

INCREASING ENTROPY FOR PASSWORD AND KEY GENERATION ON A MOBILE DEVICE

FIELD

The field relates generally to cryptography, and more particularly to mobile device security.

BACKGROUND

In the mobile domain, challenges exist with respect to the generation of keys and protecting secrets or sensitive assets. Existing approaches include the following procedures for attempting to protect a secret on a mobile device: implementing a hardware security module, incorporating stable system values, and/or utilizing a passphrase and/or passcode authentication.

Additionally, in existing approaches, the majority of mobile devices include neither a hardware root of trust nor a prevalent hardware-based method of protecting a key. Other devices include embedded secure elements (such as smart cards), but such devices do not provide open application programming interfaces (APIs) that can be accessible to developers. Further, stable system values such as an international mobile subscriber identity (IMSI) are isolated from a developer. Accordingly, mobile device and/or application management tools (mobile device management (MDM) and mobile application management (MAM), respectively) generally use passphrases to protect secrets and/or sensitive assets. However, passphrases and personal identification numbers (PINs) used in connection with mobile devices commonly have low amounts of entropy, making such security features vulnerable to attack.

Consequently, a need exists to add entropy to password-based authentication systems.

SUMMARY

One or more illustrative embodiments of the present invention provide techniques for increasing entropy for password and key generation on a mobile device.

In accordance with an aspect of the invention, a method is provided comprising the steps of: establishing a pre-determined set of cryptographic information, wherein said pre-determined set of cryptographic information comprises one or more input elements and one or more interface input behavior metrics associated with the one or more input elements; generating a prompt via a computing device interface in connection with an authentication request to access a protected resource associated with the computing device; processing input cryptographic information entered via the computing device interface in response to the prompt against the pre-determined set of cryptographic information; and resolving the authentication request based on said processing.

In accordance with an aspect of the invention, a method is provided comprising the steps of: generating each of multiple input elements to be associated with a computing device in response to user activity in connection with the computing device; displaying the multiple generated input elements via an interface of the computing device; determining one or more input modality parameters associated with the multiple generated input elements; and generating a prompt via the computing device interface. Such a method also comprises processing input cryptographic information entered via the computing device interface in response to the prompt against the multiple generated input elements and the one or more input modality parameters, wherein said processing comprises establishing the multiple generated input elements and the one or more input modality parameters as a pre-determined set of cryptographic information to be used in connection with an authentication request to access a protected resource associated with the computing device if the input cryptographic information matches the multiple generated input elements and the one or more input modality parameters.

The cryptographic techniques of the illustrative embodiments overcome one or more of the problems associated with the conventional techniques described previously, and provide mobile device security. These and other features and advantages of the present invention will become more readily apparent from the accompanying drawings and the following detailed description.

BRIEF DESCRIPTION OF THE DRAWINGS

FIG. 5 is a diagram illustrating an example user interface for implementing cryptographic techniques, according to an embodiment of the invention;

FIG. 6 is a diagram illustrating an example user interface for implementing cryptographic techniques, according to an embodiment of the invention;

FIG. 7 is a diagram illustrating an example user interface for implementing cryptographic techniques, according to an embodiment of the invention;

FIG. 8A is a diagram illustrating an example user interface for implementing cryptographic techniques, according to an embodiment of the invention;

FIG. 8B is a diagram illustrating an example user interface for implementing cryptographic techniques, according to an embodiment of the invention;

FIG. 8C is a diagram illustrating an example user interface for implementing cryptographic techniques, according to an embodiment of the invention;

DETAILED DESCRIPTION

As will be described, the present invention, in one or more illustrative embodiments, provides techniques for adding entropy to key generation on a mobile device.

Illustrative embodiments of the present invention will be described herein with reference to exemplary communication systems and associated processing devices. It is to be appreciated, however, that the invention is not restricted to use with the particular illustrative system and device configurations shown.

Accordingly, the term communication system, as used herein, is intended to be broadly construed so as to encompass any type of system in which multiple processing devices can communicate with one another. Also, the term computing device, as used herein, is intended to be construed broadly so as to encompass any type of processing device that incorporates, among other things, cryptographic functionality (such as a computer, tablet, server, mobile telephone or device, smart phone, radio-frequency identification (RFID) tag or reader, authentication token, etc.). Similarly, the term authentication server should be understood to encompass any type of processing device or set of such devices that is operative to authenticate a password provided by an authentication token or other type of computing device. As used herein, an authentication server need not be a network-based server, and may be implemented as a portion of a device that performs other functions, as a combination of multiple servers or other devices, or in other forms.

Also, cryptographic information, as used herein, is intended to include passwords, answers to life questions, or other authentication credentials, or values derived from such authentication credentials, or more generally any other information that a user may be required to submit in order to obtain access to an access-controlled application such as a key. As described herein, in accordance with at least one embodiment of the invention, cryptographic information includes a key stored and/or protected within data (for example, user-related data) selected from local memory on a user mobile device. By way of further example, such a cryptographic key can be used for encryption, decryption, hash-based message authentication code (HMAC) operations, and/or signature operations. Additionally, as used herein, a combination code includes any form of secret sequence of characters, numbers, words, pictures, etc.

Figure 1:
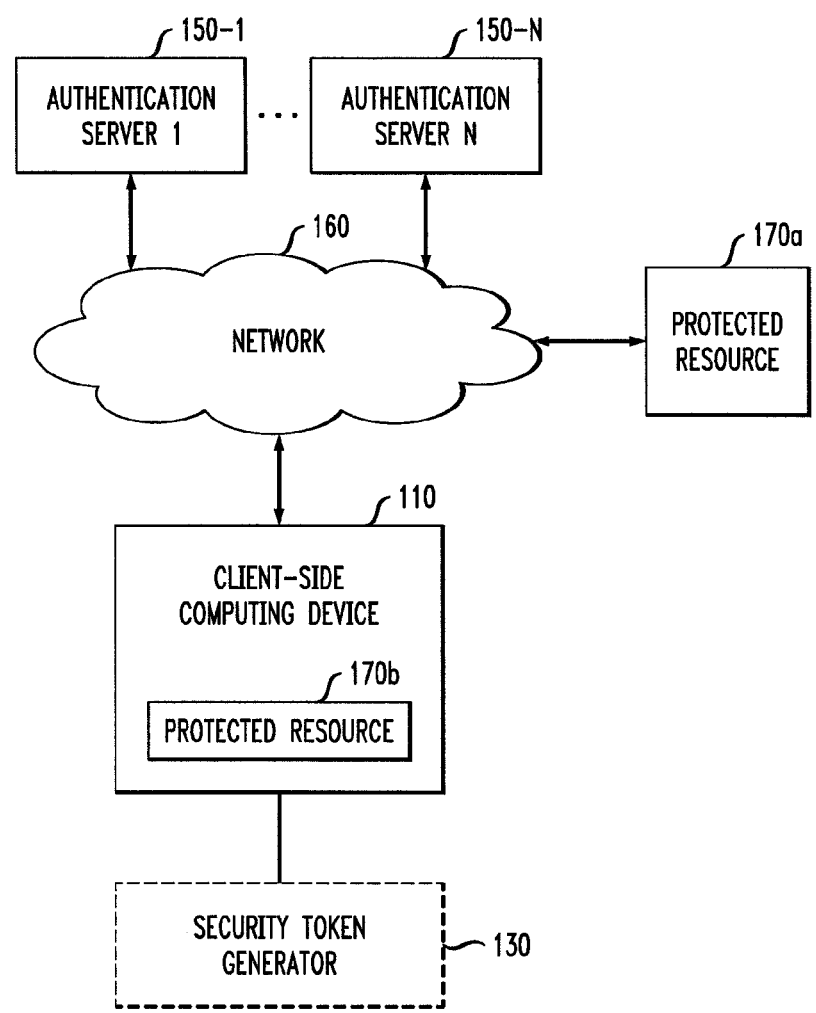
FIG. 1 is a diagram illustrating an example network environment in which one or more embodiments of the present invention can operate.

FIG. 1 illustrates an example client-side computing device (CSCD) 110 communicating with a protected resource 170a over a network 160. As detailed further below, at least one embodiment of the invention can also include a CSCD 110 that includes a protected resource 170b residing thereon. In an example implementation, a user must authenticate with one or a plurality of authentication servers 150-1 through 150-N (hereinafter, collectively referred to as authentication servers 150) using a token generated by a security token generator 130 (hereinafter, referred to as security token 130) before obtaining access to protected resource 170a and/or 170b (hereinafter, collectively referred to as protected resource 170 unless otherwise specified).

As indicated above, in at least one example embodiment of the invention described herein, a CSCD 110 can include a mobile device such as a mobile phone, a smart phone, a tablet, etc. Additionally, as depicted in FIG. 1, the network 160, may comprise, for example, a global computer network such as the Internet, a wide area network (WAN), a local area network (LAN), a satellite network, a telephone or cable network, or various portions or combinations of these and other types of networks.

According to one aspect of the invention, as noted above, the user of the CSCD 110 is authenticated using a password (also referred to herein in accordance with one or more embodiments of the invention as a combination code) generated by the security token generator 130 by authentication servers 150. The exemplary communications among the system elements 110, 130, 150 and 170 of FIG. 1 to achieve joint authentication by the authentication servers 150 is discussed further below.

It is to be appreciated that a given embodiment of the disclosed system may include multiple instances of CSCD 110, security token 130 and protected resource 170, and possibly other system components, although only single instances of such components are shown in the simplified system diagram of FIG. 1 for clarity of illustration.

The security token 130 is shown in FIG. 1 as being separate from and electrically connected to the CSCD 110. The security token 130 may be a server or other type of module that is accessible over the network 160, or it may be a software component resident on the CSCD 110. As another alternative, security token 130 may be distributed over multiple devices, one of which may be the CSCD 110. Also, for example, the security token 130 can encompass a handheld device with no connection to the other noted components, or can encompass a software application running on the CSCD 110.

Accordingly, while at least one embodiment of the present invention is illustrated herein using a security token 130 electrically connected to the CSCD 110, such that the CSCD 110 can read a given token code (or another authentication value) directly from the security token 130, other implementations are within the scope of the present invention (such as radio frequency (RF), infrared, etc.), as would be apparent to a person of ordinary skill in the art. By way of example, for security tokens 130 that are not connectable to a computer or other user device in this manner, the user may manually enter a password or another value displayed by the security token 130 at the time of the attempted access, as further detailed herein in accordance with one or more embodiments of the invention.

As noted, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of cryptographic techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other cryptographic information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the cryptographic information that is presented by a CSCD 110.

Further, the protected resource 170 may be, for example, an access-controlled application, web site or hardware device. In other words, a protected resource 170 is a resource that grants user access responsive to an authentication process, as will be described in greater detail below. For example, protected resource 170a may include an access controlled file, e-mail, a protected application, a remote application server such as a web site or other software program or hardware device that is accessed by the CSCD 110 over a network 160.

Additionally, in at least one embodiment of the invention, protected resource 170b can include one or more applications or data residing on the CSCD 110 itself. For example, such a protected resource 170b can include access to a mobile data management container for launching applications on the CSCD 110 (such as a mobile device), which can be protected requiring a successful token-based authentication in order to run the application(s) protected by the container. Further, protected resource 170b could also include an access controlled file, e-mail, a protected application, a remote application server such as a web site or other software program or hardware device that is accessed by the CSCD 110 over a network 160. Similarly, it is possible that in order to unlock the mobile platform to perform operations, a successful authentication with the security token might be required.

As described herein, at least one embodiment of the invention includes generating and/or providing a user interface for a mobile device that presents a virtual combination lock presenting numbers, characters and/or images to introduce additional entropy to the cryptographic process. Additionally, at least one embodiment of the invention includes facilitating ease and accuracy of use regarding a cryptographic process response entry on a mobile device. For example, implementing an aspect of directionality with respect to a virtual combination lock can ameliorate challenges faced by users with broad or sizeable fingers and/or devices with small keyboards or input buttons.

Figure 2:
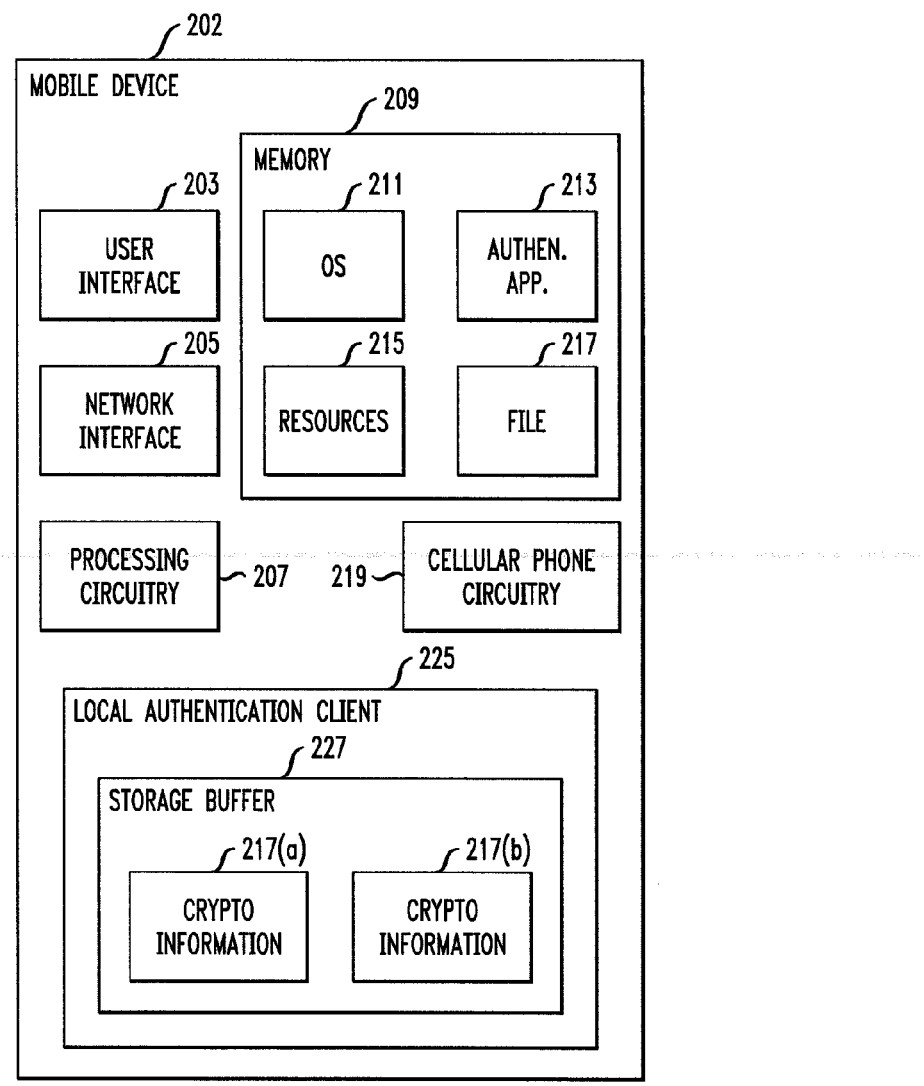
FIG. 2 is a system diagram of an exemplary mobile device on which at least one embodiment of the invention can be implemented.

FIG. 2 is a system diagram of an exemplary mobile device 202 on which at least one embodiment of the invention can be implemented. By way of illustration, FIG. 2 depicts a network interface 205 of the mobile device 202 configured to connect the mobile device 202 to a communications medium such as, for example, Wi-Fi and/or cellular telephony. Accordingly, the network interface 205 enables the mobile device 202 to communicate with the other components of an electronic environment. Additionally, the mobile device 202 includes a user interface 203 configured to receive user input and provide user output, such as a data file and/or data file location selection(s), such as described herein. One or more embodiments of the invention can include components such as a display screen, a capacitive touch display, and a push-button keyboard implemented for use in connection with the user interface 203.

Additionally, for completeness, cellular phone circuitry 219 within mobile device 202 allows the user to establish cellular phone calls with other callers having remote devices, as would be appreciated by one skilled in the art.

The memory 209 of mobile device 202 is configured to store one or more software constructs including, for example, an operating system 211, an authentication application 213, data for protected resources 215 (documents, restricted applications, etc.), a cryptographic information file 217, as well as other suitable or relevant material. Further, the processing circuitry 207 of mobile device 202 is configured to operate in accordance with the software constructs stored in the memory 209. By way of example, when the processing circuitry 207 runs the operating system 211, the processing circuitry 207 provides a secure electronic platform on which a user is able to carry out work. Such an electronic platform is capable of operating, for example, as a container to protect data and requiring user authentication before permitting access. Further, when the processing circuitry 207 runs the authentication application 213, the processing circuitry 207 communicates with the local authentication client 225 in a secure manner, for example, to obtain cryptographic information 217(a), 217(b), etc. from storage buffer 227, as additionally described herein.

It should be appreciated that the processing circuitry 207 can include one or more processors running specialized software components, such as detailed in connection with the techniques detailed herein and further depicted in FIG. 3.

In at least one embodiment of the invention, once the mobile device 202 is able to obtain valid cryptographic information, the user of the mobile device 202 is able to perform local user authentication to access protected resources. Accordingly, as noted, the mobile device 202 is provisioned with the authentication application 213 and cryptographic information file 217 holding pre-determined cryptographic information. For example, and as further detailed in connection with FIG. 3, such pre-determined cryptographic information can include one or more input elements (such as letters, numbers, characters, etc.) and one or more interface input behavior metrics associated with the one or more input elements (such as directionality, velocity, etc.). As further described herein, such pre-determined cryptographic information can be learned and updated over time.

Consequently, the processing circuitry 207 of the mobile device 202 can perform a local cryptographic operation using cryptographic information 217 stored in the memory 209. In at least one embodiment of the invention the processing circuitry 207 runs the authentication application 213, which directs the user of the mobile device 202, via the user interface 203, to enter cryptographic information which is captured as one or more input elements 217(a). Additionally, the processing circuitry 207, via a software component resident thereon, calculates one or more interface input behavior metrics 217(b) associated with the one or more input elements 217(a). While the captured cryptographic information 217(a) and 217(b) are temporarily stored in the storage buffer 227 of the local authentication client 225, the authentication application 213 compares the captured user-provided cryptographic information 217(a) and 217(b) with the appropriate expected items of cryptographic information from file 217.

If a match is determined via this comparison, the authentication application 213 permits the user to access a protected resource (such as, for example, data in association with element 215 that is stored in the memory 209).

Figure 3:
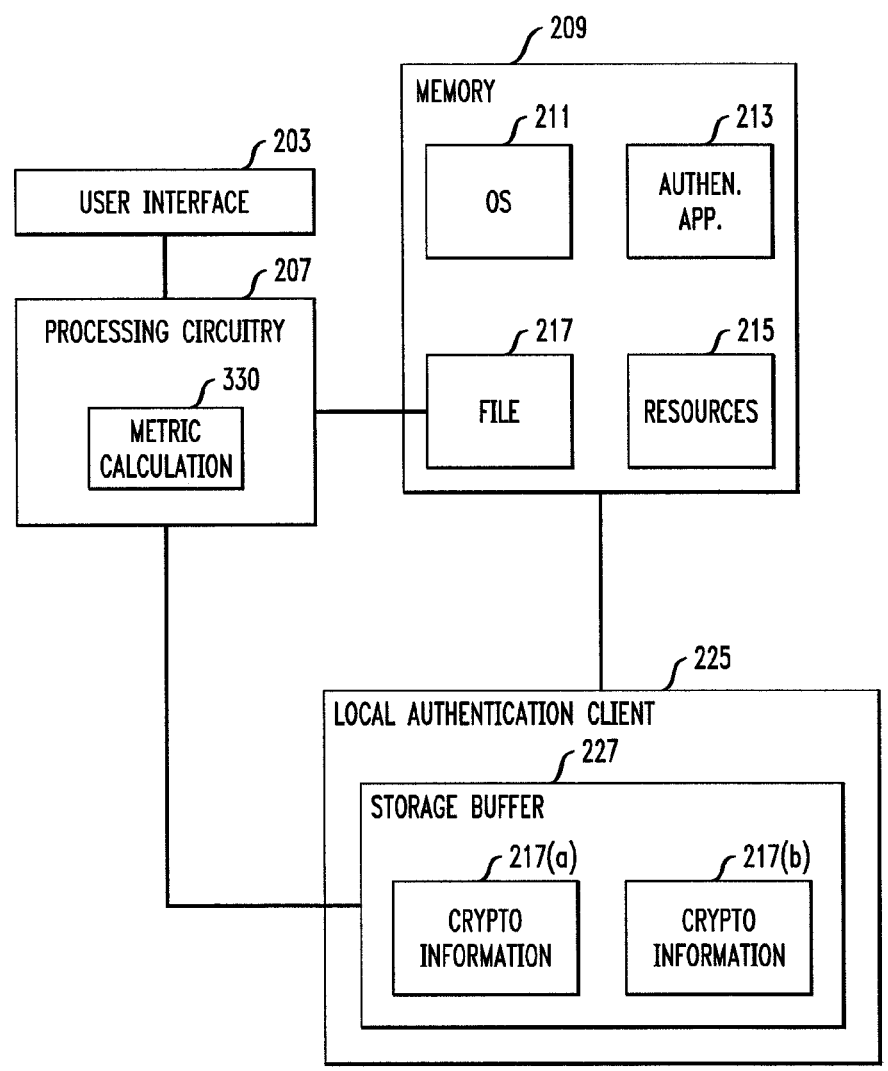
FIG. 3 is a system diagram of exemplary mobile device components, in accordance with at least one embodiment of the invention.

FIG. 3 is a system diagram of exemplary mobile device components, in accordance with at least one embodiment of the invention. As depicted in FIG. 3, a user can enter cryptographic information via user interface 203. This entered cryptographic information is captured as one or more input elements 217(a). Such elements can include, as additionally detailed herein, letters, numbers, characters, symbols, colors, images, etc. Upon being entered via the user interface 203, an input behavior metric calculation component 330 resident on the processing circuitry 207 calculates one or more interface input behavior metrics 217(b) associated with the one or more entered input elements 217(a). As described further herein, the interface input behavior metrics can include directionality of input via the user interface, number of iterations of an action in connection with input via the user interface, velocity of input via the user interface, etc.

Accordingly, the captured one or more input elements 217(a) and corresponding interface input behavior metrics 217(b) can be stored in cryptographic information file 217 as the pre-determined cryptographic information for a given cryptographic process.

Consequently, a corresponding cryptographic flow (carried out, for example, by authentication application 213 as run by operating system 211) can take the following exemplary form. The user is prompted (via user interface 203 such as additionally depicted in FIG. 4 or FIG. 5) to enter cryptographic information in connection with an authentication request to access a protected resource associated with the mobile device (for example, the user wishes to access and/or unlock his or her smart phone). The entered cryptographic information is captured by the processing circuitry 207 as one or more input elements 217(a), and the input behavior metric calculation component 330 resident thereon calculates one or more interface input behavior metrics 217(b) associated with the one or more entered input elements 217(a), and stores both 217(a) and 217(b) temporarily in the storage buffer 227 of the local authentication client 225.

Subsequently, the authentication application 213 compares the captured user-provided cryptographic information 217(a) and 217(b) with the pre-determined cryptographic information from file 217 stored in memory 209. If the user-entered input elements 217(a) match those stored in file 217, and if the one or more interface input behavior metrics 217(b) associated with input elements 217(a) also match those stored in file 217, authentication is deemed successful and the user is granted access to the protected resource in question.

Figure 4:
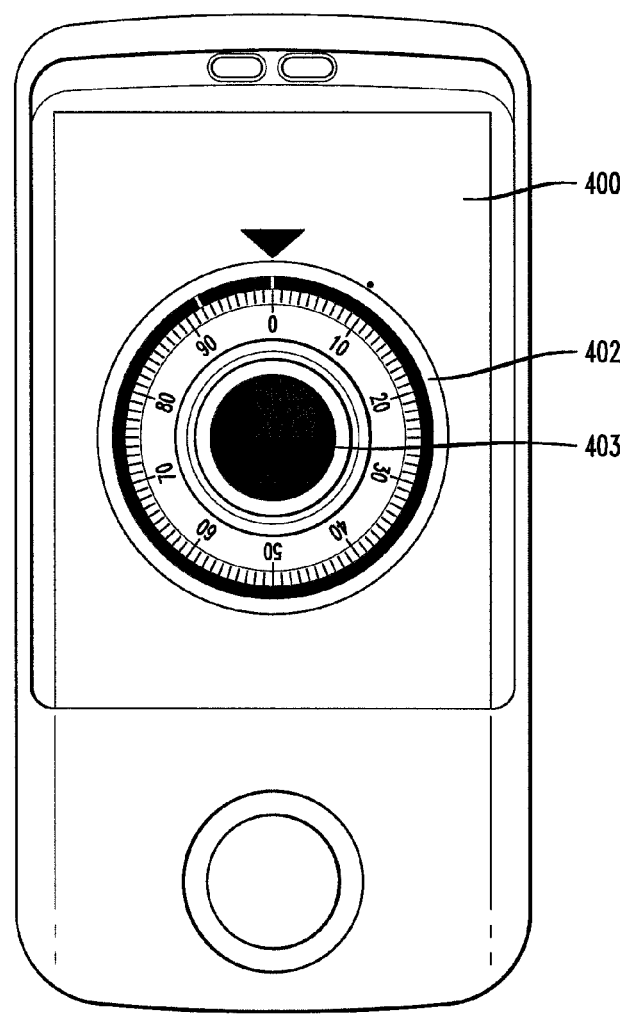
FIG. 4 is a diagram illustrating an example user interface for implementing cryptographic techniques, according to an embodiment of the invention.

FIG. 4 is a diagram illustrating an example user interface 400 for implementing cryptographic techniques, according to an embodiment of the invention. By way of illustration, FIG. 4 depicts interface 400 which includes a virtual combination lock 402 presenting numbers from 0-99 (or from 0 to 39 (as in most traditional combination locks) or any other number range that can provide sufficient entropy) and a selection button 403.

In an example scenario, a user is prompted for a combination code upon requesting authentication (for example, when the user attempts to access or unlock his or her mobile phone). Subsequently, the user enters each number in the sequence of numbers representing his or her combination code by manipulating the virtual combination lock 402 (for instance, by swiping a finger in a circular direction over the virtual combination lock on the interface in a clockwise or counter-clockwise direction) until the virtual combination lock points to or otherwise indicates the desired number. The user repeats the process to enter the next number in the code, in the alternate direction or the same direction, until all numbers in the combination code are entered, at which point the user can press or tap the button 403 to enter the selected combination code. In this example embodiment of the invention, the combination code can be thought of as the combination lock code which typically includes threes numbers. The user will have to remember the three numbers and enter the three numbers by rotating the virtual combination lock either left or right via a specified number of turns.

Additionally, as an optional feature, at least one embodiment of the invention can include the aspect of briefly presenting the entered number(s) in a window shown below the virtual combination lock 402 in example interface 400.

Using a combination code entry method such as described above in connection with FIG. 4, entropy is added to the cryptographic process by incorporating directionality of turns of the virtual combination lock as well as the number and directionality of turns of the virtual combination lock as elements in the process (which can be selected during enrollment or by policy, as further described herein).

Further, at least one embodiment of the invention includes implementing a learning period wherein the mobile device discovers patterns regarding the velocity with which the user commonly enters his or her combination code. More generally, one or more interface input behaviors are detected over time (for example, over a pre-defined period of time, or continuously) to determine an identifiable value range for the one or more interface input behaviors for subsequent use as a cryptographic value. Input behaviors can include, for example, directionality of movement, velocity of movement, finger touch angle and pressure on a touch-screen device, size and shape of the fingerprint, the orientation of the device, etc. Such input behaviors indicate which hand and fingers the user typically uses to enter the code, thereby adding another level of assurance about user identity.

Such items of data can be collected via the user interface (for example, a touch screen). Detected data points can be placed on a time-based graph to observe and/or determine a funnel-like effect. For example, it can be determined, over time, that the user password is entered on a given mobile device in a range of 1.5 seconds to 1.8 seconds based on detecting this given interface input behavior (that is, velocity) over time. Therefore, that value range could serve a cryptographic parameter in subsequent cryptographic actions. Additionally, a range of such indicators (such as velocity of entry, as noted in the preceding example), and selection of direction can be used.

Typically in combination locks, the user alternates directionality: first turning the virtual combination lock left, then turning the virtual combination lock right, and then turning the virtual combination lock left again (or vice versa). For higher entropy, one or more embodiments of the invention can include randomizing the directionality at enrollment time.

As noted above, for example, a mobile device can learn, after an appropriate training period over a number of user entries, that the combination code is commonly correctly entered within a duration range of 1.5 seconds to 1.8 seconds (possibly with additional sub-ranges covering each individual input of the combination code within that duration). Accordingly, in such an embodiment of the invention, authentication can be denied if the combination code, even if the numerical (and directional and/or number of turns) input is correct, is entered slowly or quickly enough so as to fall outside of the learned range.

Additionally, while the example interface 400 depicted in FIG. 4 illustrates a virtual combination lock 402 with a numerical range from 0-99, it is to be appreciated that one or more embodiments of the invention can encompass and/or incorporate numerous alternative features and/or combinations of features. By way merely of example, the virtual combination lock can include characters and/or letters in lieu of or in addition to numbers. For instance, a user can be required to initially select a password that includes multiple varying elements (for example, at least one capital letter, at least one lower-case letter, and at least one number). Another alternative can include using words or a mix of words and numbers. For example, the virtual combination lock can display, at enrollment time, 20 or more words that are randomly selected from a dictionary, or names of things given a theme that the user selects (cities, teams, animals, birds, etc). The words may include upper and lower characters. The user is then asked to select three or more favorite words to constitute a passphrase. Alternatively, the virtual combination lock can include images, symbols, pictures and/or colors, for example.

Further, in at least one embodiment of the invention, a virtual combination lock can be used with two or more dials (for example, one smaller dial placed within a larger dial), wherein the two or more dials of the virtual combination lock can include the same elements (for example, numbers, letters, characters, colors, etc.) and/or different elements from one another, and the additional interface input behavior metrics of touch pressure, touch angle, directionality, number of turns, and velocity can be separately considered for each dial, thereby incorporating additional entropy to the cryptographic process.

Additionally, as noted above, an embodiment of the invention such as depicted in FIG. 4, for example, can also facilitate use and/or accuracy of user input in situations wherein, for example, the user has broad or large fingers or wherein the touch-screen (or keyboard or keypad) on the device interface is of a small size such that erroneous inputs are commonly and/or easily entered.

FIG. 5 is a diagram illustrating an example user interface for implementing cryptographic techniques, according to an embodiment of the invention. By way of illustration, FIG. 5 depicts interface images 502, 504 and 506, each of which includes a virtual combination lock presenting numbers between 0 and 99.

Similar to the illustration depicted in FIG. 4, in an example scenario, a user is prompted for a combination code upon requesting authentication, and thereafter the user manipulates the virtual combination lock interface to enter each number in the sequence of numbers representing his or her combination code (for instance, by swiping a finger up or down over each dial on the interface) until the virtual combination lock indicates the desired number at the targeted position on the virtual combination lock.

As specifically depicted in FIG. 5, interface image 502 shows a user turning the virtual combination lock two full turns to the right, and then turning the virtual combination lock (still to the right) to the first desired number. Subsequently, interface image 504 shows the user turning the virtual combination lock to the left, to the second desired number. Finally, interface image 506 shows the user turning the virtual combination lock to the right, to the third desired number.

A virtual combination lock, such as depicted in FIG. 5, for example, can be used to lock a device, a container and/or an application. Unlocking a device, container, application, etc. using passwords typically requires verifying the password to authenticate the user, and then deriving a data encryption key or a key wrapping key from the same password, or parts of the password, in combination with device hardware and/or software attributes. The virtual combination lock can provide higher entropy than traditional combination codes and most user-selected passwords, and as noted herein, a virtual combination lock may include any variation of numbers that can be adapted to the device's screen size.

At least one embodiment of the invention can include implementing a software application to generate the virtual combination lock numbers randomly via use of the device's accelerometer. Additionally, an encryption key can be derived from the series of combination numbers and the numbers in between. Further, and as additionally illustrated in the subsequent figures, instead of numbers, the combination lock can be displayed to the user as a wheel of colored circles, rings, shapes, pictures, words, or combinations of the same that the user and/or the system selects from a database of objects (such as the device's gallery, the device's address book, or a cloud service).

Accordingly, at least one embodiment of the invention includes an enrollment aspect. By way of example, to create and register a virtual combination lock code for a device, the user can shake and/or move the device (such as a smart phone) in multiple directions for a period of time (for example, 20 seconds or more) to generate the first random number using the device's accelerometer. A ring tone or other audio signal can be produced and played by the device when the first number is generated. In such an example embodiment, the user continues to shake and/or move the device to similarly generate a second and a third number (or however many numbers as is required and/or desired by the user or device). As should be appreciated by one skilled in the art, a similar method can be used to select random words from a dictionary, pictures from a local or remote database, colors, shapes, etc.

Additionally, the example enrollment process would continue via the device displaying the three randomly generated numbers and prompting the user to select a corresponding input combination mode, such as right-left-right or left-right-left, for example. A software application on the device then displays the virtual combination lock and prompts the user to open or unlock the virtual combination lock by providing step-by-step instructions, including the randomly generated numbers. The software application additionally prompts the user to open the lock in this initial instance without any device-provided instructions, although the application can, for example, provide one or more hints to the user as needed until the user remembers correct input and opens the lock. In this example embodiment of the invention, if the enrollment process times-out or is interrupted at any stage, the user must generate new (random) numbers to enroll.

To authenticate and unlock the virtual combination lock, the user must turn the virtual combination lock of the lock to the correct numbers, in the right sequence, and in the right direction (right-left-right or left-right-left), as specified in the enrollment process. In at least one embodiment of the invention, verification is performed after the all of numbers (three numbers, in the above example) are selected and entered by the user. Failure to select the correct numbers after a predetermined number of attempts causes the device, container and/or the application to be locked for a pre-determined period of time before the user can attempt to unlock the virtual combination lock again.

Additionally, at least one embodiment of the invention includes an aspect of key derivation. Deriving an encryption key includes concatenating the selected combination lock numbers (three numbers, in the above example) and all of the numbers in sequence to go from one number to the next number or until a fixed number of digits is collected to form a long string of digits. The string can then be used in a standard password-based key derivation function to derive a desired cryptographic key. The salt can be generated, for example, on the server, and provisioned and encrypted on the device using the native encryption on device. It is to be appreciated by one skilled in the art that one or more additional techniques can be used to generate salt.

By way merely of example illustrating an embodiment such as detailed in the above paragraph, in a virtual combination lock of numbers from 0 to 49, assume that the randomly selected numbers during enrolment are 7, 25 and 40, and the directionality is right-left-right. Accordingly, the first right turn (clockwise) to number 7 from number 0 (after two full turns for reset), numbers 49 to 7 (in descending order), are selected to create the first string of 83 digits: 494847 . . . 10987. The second left turn (counter-clockwise) to number 25 from number 7, numbers 8 to 25 (in ascending order), are selected to create the second string of 34 digits: 89101112 . . . 232425. The last right turn (clockwise) to number 40 from number 25, numbers 24 to 40 (in descending order, from 24 to 0 and then from 49 to 40), are selected to create the third string of 60 digits: 242322 . . . 3210494847 . . . 40. The three strings are then concatenated to produce a very long string of 177 digits, and the string of digits is then used with a salt in a key derivation function to derive an encryption key. It should be noted that adding all of the numbers from the current number to the next number as described above provides the same entropy as adding just the next number. The next number indicates whether the virtual combination lock is turned to right or to the left.

As noted herein, many alternative design approaches can be implemented with respect to the device interface to enhance the security and/or the usability of one or more embodiments of the invention. Some exemplary alternative approaches include the interfaces depicted in FIG. 6, FIG. 7, as well as FIG. 8A-8C.

FIG. 6 is a diagram illustrating an example picture-based virtual combination lock interface for implementing cryptographic techniques, according to an embodiment of the invention. As specifically depicted in FIG. 6, interface image 602 shows a user turning the virtual combination lock two full turns to the right, and then turning the virtual combination lock (still to the right) to the first desired picture. Subsequently, interface image 604 shows the user turning the virtual combination lock to the left, to the second desired picture. Further, interface image 606 shows the user turning the virtual combination lock to the right, to the third desired picture.

In at least one embodiment of the invention implementing a picture-based virtual combination lock interface, the user selects the desired and/or required number (three, in the FIG. 6 example) of secret pictures (that is, known and/or selected exclusively by the user) from a database in the device such as the user's photograph database, contact photos, photos stored in the cloud, photos of friends in social networks, etc. Additionally, in at least one embodiment of the invention, default system pictures can be provisioned onto each device, or personalized pictures can be taken by the user using the device camera at enrollment and activation time. Also, enrollment can occur in the same fashion as detailed above with respect to numerical inputs.

FIG. 7 is a diagram illustrating an example ring or color-based virtual combination lock interface for implementing cryptographic techniques, according to an embodiment of the invention. As specifically depicted in FIG. 7, interface image 702 shows the user turning the virtual combination lock two full turns to the right, and then turning the virtual combination lock (still to the right) to the first desired ring or color. Subsequently, interface image 704 shows the user turning the virtual combination lock to the left, to the second desired ring or color. Further, interface image 706 shows the user turning the virtual combination lock to the right, to the third desired ring or color.

FIG. 8A is a diagram illustrating an example shape and color-based virtual combination lock interface for implementing cryptographic techniques, according to an embodiment of the invention. As specifically depicted in FIG. 8A, a user would turn the virtual combination lock two full turns to the right, then turn the virtual combination lock once to the left, and then turn the virtual combination lock once to the right to select three desired colored shapes.

FIG. 8B is a diagram illustrating an example multi-dial color-based virtual combination lock interface for implementing cryptographic techniques, according to an embodiment of the invention. As specifically depicted in FIG. 8B, a user would touch the interface to select a desired color from the inner diamond, then turn the outer dial of the virtual combination lock twice to the right, then turn the dial of the virtual combination lock once to the left, and then turn the dial of the virtual combination lock once to the right to select three additional desired colors.

FIG. 8C is a diagram illustrating an example multi-dial color-based virtual combination lock interface for implementing cryptographic techniques, according to an embodiment of the invention. As specifically depicted in FIG. 8C, a user would touch the interface to select a desired color from the inner circle, then touch the interface to select a second desired color from the middle circle, and then turn the outer circle (once or twice) to the right or (once or twice) to the left to select a third desired color.

Further, as noted herein, at least one embodiment of the invention includes implementing a learning period wherein the mobile device discovers patterns regarding the velocity with which the user commonly enters his or her password (numbers, words, picture-based, color-based, shape-based, etc), and subsequently incorporating velocity as an additional entropy element for the cryptographic process as well as, for example to provide a two-factor authentication method. In addition to the velocity with which the user commonly enters his or her password, at least one embodiment of the invention can additionally incorporate input behavior metrics including touch pressure and/or touch angles.

Additionally, at least one embodiment of the invention can include an implementation so as to protect cryptographic information such as a key in one or more data files resident on a mobile device. Such a key can, for example, be used to encrypt or lock a content container or an application container, thereby serving to further protect data and/or wrap applications that contain credentials. Additionally, such a key (or other piece of cryptographic information) can, for example, be used to unlock or decrypt a container of additional keys. By way of example, consider a scenario wherein a user attempts to access an application that is controlled by a mobile device management component, such as email, that includes both online and offline data. Accordingly, in such a scenario, the user is challenged to authenticate and provide entropy to generate a key to access his or her email.

Further, while the examples depicted in above-noted figures illustrate various configurations, it is to be appreciated that one or more embodiments of the invention can encompass and/or incorporate numerous alternative features and/or combinations of features with respect to the dials and interface. By way of example, the set of dials can include characters and/or letters in lieu of or in addition to numbers. For instance, as noted above, a user can be required to initially select a password that includes multiple varying elements (for example, at least one capital letter, at least one lower-case letter, and at least one number). Alternatively, for example, the set of dials can include images, symbols, pictures and/or colors, or a combination thereof. For example, the user can be queried to select only three or four numbers, words, pictures, etc. Characters can be used as long as a large set of characters are utilized (from example, all American Standard Code for Information Interchange (ASCII) printable characters) and the user is required to select at least five characters for higher entropy.

At least one embodiment of the invention additionally includes hashing a combination of selected images and/or pictures to leverage the entirety of data contained therein to add further entropy to a cryptographic process. Such an embodiment includes selecting an image object and running a hash function such as MD5 (a message digest algorithm) or a secure hash algorithm (SHA) thereon, with or without salting, and subsequently trimming or carrying out a partial selection (for example, selecting the first x bytes).

Further, at least one embodiment of the invention includes re-ordering the input user combination code after entry to incorporate an additional layer of entropy. For example, a user can enter a (correct) combination code of "1 2 3 1 2 3," after which, the mobile device can map this input combination code to a unique user via a mapping table so as to identify a re-ordered version of the combination code (for example, "1

3 2 1 3 2") that is used by the device to grant authentication to the user. By way of example, the mobile device can store such a mapping table in local memory or some other storage component. Similarly, at least one embodiment of the invention includes mapping an input user combination code to a more sophisticated and/or complex combination code after entry of the combination code by the user to incorporate an additional layer of entropy (or to comply, for example, with a corporate policy in a corporate or enterprise context). For example, a user can enter a (correct) combination code of "1 2 3 1 2 3," after which, the mobile device can map this input combination code to a unique user via a mapping table so as to identify a separate version of the combination code (for example, "B 8 k 0 W R 6 N A 2 P a t 9 L") that is used by the device to grant authentication to the user.

Figure 9:
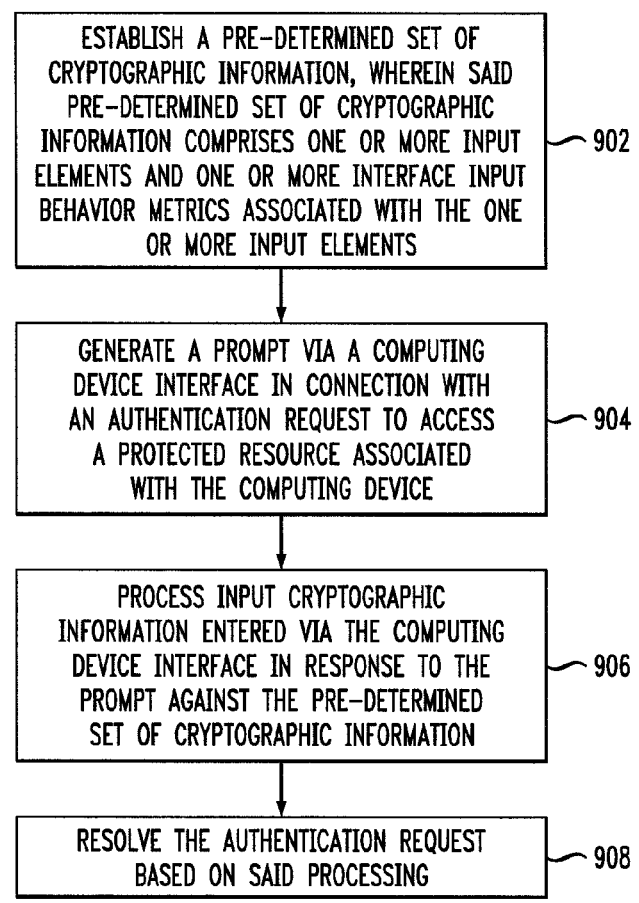
FIG. 9 is a flow diagram illustrating techniques according to an embodiment of the invention.

FIG. 9 is a flow diagram illustrating techniques according to an embodiment of the present invention. Step 902 includes establishing a pre-determined set of cryptographic information, wherein said pre-determined set of cryptographic information comprises one or more input elements and one or more interface input behavior metrics associated with the one or more input elements. The one or more input elements in said pre-determined set of cryptographic information can include multiple elements of varying type. For example, input elements can include a number, a letter, a character, a symbol, a word, an image, a picture, a photograph, a color, a shape, a colored or shaded shape, and/or a combination thereof.

As described herein, interface input behavior metrics associated with the one or more input elements can include, for example, touch pressure of input via the computing device interface, touch angle of input via the computing device interface, directionality of input via the computing device interface, a distinct number of iterations of an action in connection with input via the computing device interface, and/or velocity of input via the computing device interface.

Step 904 includes generating a prompt via a computing device interface in connection with an authentication request to access a protected resource associated with the computing device. Step 906 includes processing input cryptographic information entered via the computing device interface in response to the prompt against the pre-determined set of cryptographic information. In at least one embodiment of the invention, input cryptographic information can include one or more items of authentication information, and said pre-determined set of cryptographic information can include a set of authentication information.

Step 908 includes resolving the authentication request based on said processing. Resolving the authentication request includes granting access to the protected resource associated with the computing device if the input cryptographic information matches the pre-determined set of cryptographic information. Further, resolving the authentication requests additionally includes denying access to the protected resource associated with the computing device if the input cryptographic information does not match the pre-determined set of cryptographic information. Also, at least one embodiment of the invention includes deriving an encryption key based on said input cryptographic information entered via the computing device interface.

The techniques depicted in FIG. 9 can also include determining a pattern associated with input via the computing device interface in connection with the one or more interface input behavior metrics over multiple iterations of said processing step to establish one or more updated interface input behavior metrics associated with the one or more input elements. Additionally, at least one embodiment of the invention can further include updating the pre-determined set of cryp-tographic information based on the one or more updated interface input behavior metrics.

Additionally, the techniques depicted in FIG. 9 can include converting the one or more input elements to a second version of the one or more input elements for granting access to the protected resource associated with the computing device, wherein said converting comprises mapping the one or more input elements to a unique user via a mapping table so as to identify a version of the one or more input elements for granting access to the protected resource associated with the computing device.

Figure 10:
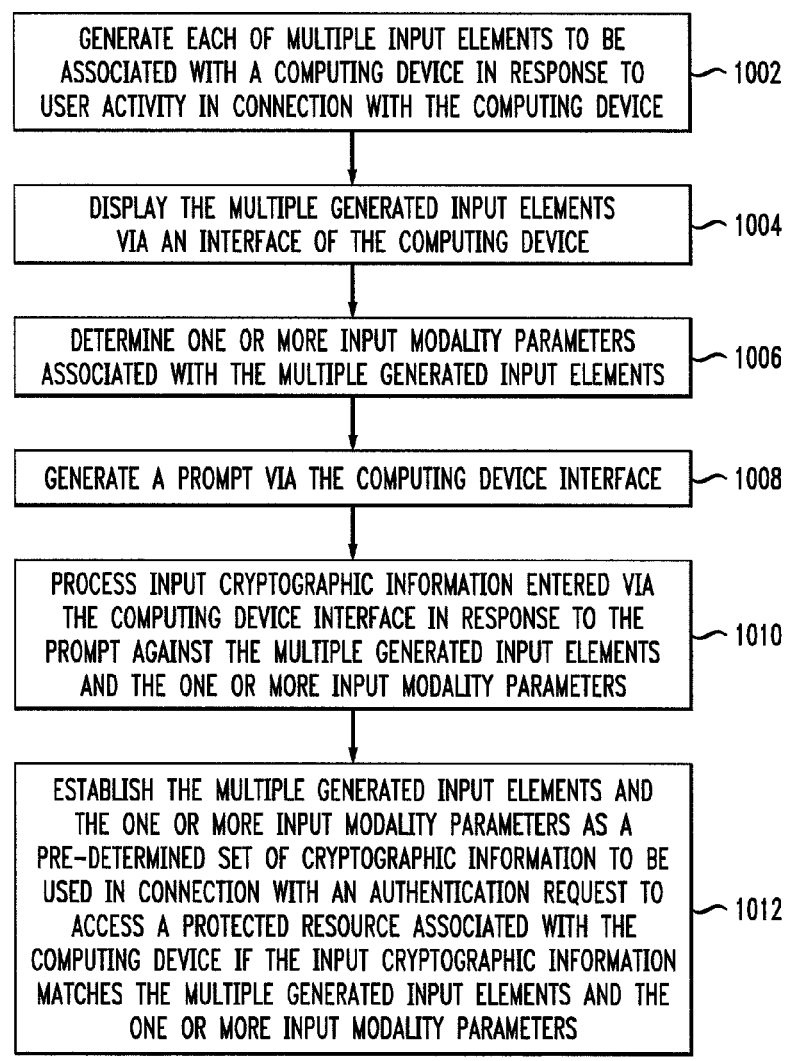
FIG. 10 is a flow diagram illustrating techniques according to an embodiment of the invention.

FIG. 10 is a flow diagram illustrating techniques according to an embodiment of the invention. Step 1002 includes generating each of multiple input elements to be associated with a computing device in response to user activity in connection with the computing device. Generating each of the multiple input elements can include utilizing an accelerometer associated with the computing device. Additionally, generating each of the multiple input elements can include identifying each of the multiple input elements within a database of the computing device based on user selection.

Step 1004 includes displaying the multiple generated input elements via an interface of the computing device. Step 1006 includes determining one or more input modality parameters associated with the multiple generated input elements. Determining the one or more input modality parameters can include prompting a user to select one or more input modality parameters. Step 1008 includes generating a prompt via the computing device interface.

Step 1010 includes processing input cryptographic information entered via the computing device interface in response to the prompt against the multiple generated input elements and the one or more input modality parameters. Step 1010 additionally includes step 1012, which includes establishing the multiple generated input elements and the one or more input modality parameters as a pre-determined set of cryptographic information to be used in connection with an authentication request to access a protected resource associated with the computing device if the input cryptographic information matches the multiple generated input elements and the one or more input modality parameters.

Figure 11:
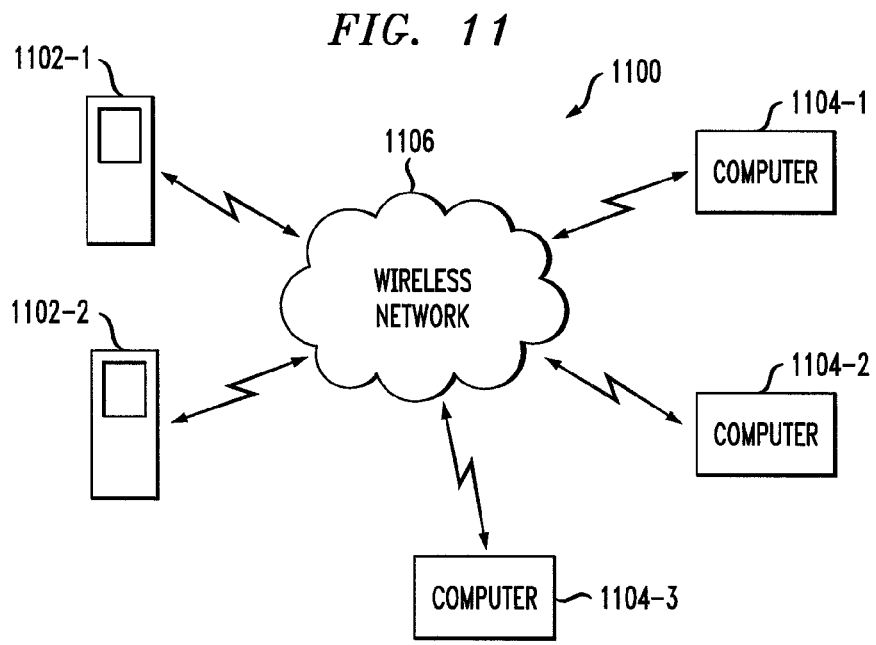
FIG. 11 shows an example embodiment of a communication system that may incorporate functionality of the type illustrated in at least one embodiment of the invention.

Cryptographic techniques of the type described herein may be implemented in a wide variety of different applications. An additional exemplary communication system application that may incorporate such techniques will now be described with reference to FIG. 11, which includes a communication system 1100 comprising a plurality of mobile telephones 1102-1 and 1102-2 and computers 1104-1, 1104-2 and 1104-3, configured to communicate with one another over a network 1106.

Any two or more of the devices 1102 and 1104 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 12:
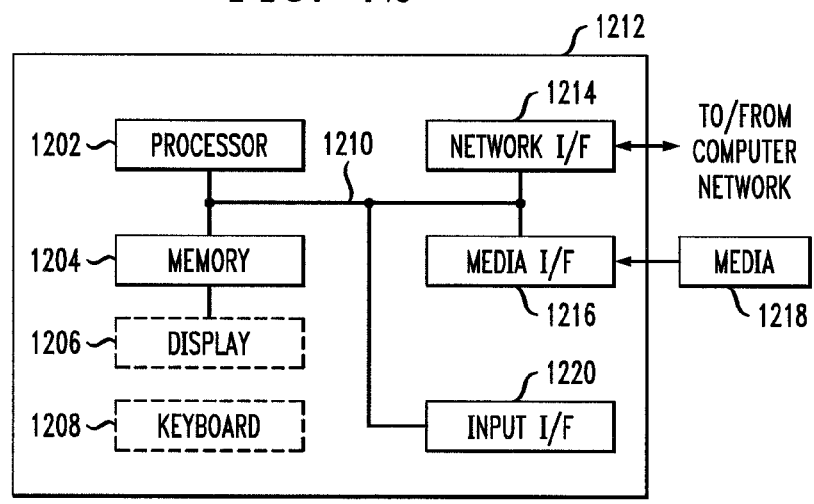
FIG. 12 is a system diagram of an exemplary computer system and/or client-side computing device on which at least one embodiment of the invention can be implemented.

By way of example, an aspect of the present invention can make use of software running on a general purpose computer. For instance, FIG. 12 is a system diagram of an exemplary computer system on which at least one embodiment of the invention can be implemented. As depicted in FIG. 12, an example implementation employs, for example, a processor 1202, a memory 1204, and an input/output interface formed, for example, by a display 1206 and a keyboard 1208. The term "processor" as used herein includes any processing device(s), such as, for example, one that includes a central processing unit (CPU) and/or other forms of processing circuitry. Additionally, the processor 1202 as shown may be viewed as representing, for example, CSCD 110, security token generator 130, authentication servers 150 and protected resource 170. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse, touch-screen, etc.) and a mechanism for providing results associated with the processing unit (for example, a printer).

The processor 1202, memory 1204, and input/output interface such as display 1206 and keyboard 1208 can be interconnected, for example, via bus 1210 as part of a data processing unit 1212. Suitable interconnections via bus 1210, can also be provided to an input interface 1220 (such as a touch-screen), a network interface 1214 (such as a network card), which can be provided to interface with a computer network, and to a media interface 1216 (such as a diskette or compact disc read-only memory (CD-ROM) drive), which can be provided to interface with media 1218.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1208, displays 1206, and pointing devices, can be coupled to the system either directly (such as via bus 1210) or through intervening I/O controllers.

Network adapters such as network interface 1214 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1212 as depicted in FIG. 12)

running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), Flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from additional entropy in key generation. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    establishing a pre-determined set of cryptographic information for a computing device, wherein said pre-determined set of cryptographic information comprises two or more input elements and one or more interface input behavior metrics associated with the two or more input elements, wherein the two or more input elements are selected by a user of the computing device, in a given sequence, from a collection of multiple items of non-alpha-numeric data stored on the computing device, and wherein said one or more interface input behavior metrics comprise one or more of (i) touch pressure of input via the computing device interface, (ii) touch angle of input via the computing device interface, (iii) directionality of input via the computing device interface, (iv) a distinct number of iterations of an action in connection with input via the computing device interface, and (v) velocity of input via the computing device interface;
    generating a prompt via the computing device interface in connection with an authentication request to access a protected resource associated with the computing device;
    processing input cryptographic information entered via the computing device interface in response to the prompt against the pre-determined set of cryptographic information; and
    resolving the authentication request based on said processing.

2. The method of claim 1, wherein said computing device interface comprises a virtual combination lock.

3. The method of claim 1, further comprising:
    determining a pattern associated with input via the computing device interface in connection with the one or more interface input behavior metrics over multiple iterations of said processing step to establish one or more updated interface input behavior metrics associated with the two or more input elements.

4. The method of claim 3, further comprising:
    updating the pre-determined set of cryptographic information based on the one or more updated interface input behavior metrics.

5. The method of claim 1, wherein said input cryptographic information comprises one or more items of authentication information, and wherein said pre-determined set of cryptographic information comprises a set of authentication information.

6. The method of claim 1, wherein said two or more input elements comprise at least one of a character, a symbol, an image, a picture, a photograph, a color, a shape, a shaded shape, and a combination thereof.

7. The method of claim 1, wherein said resolving comprises:
granting access to the protected resource associated with the computing device if the input cryptographic information matches the pre-determined set of cryptographic information.

8. The method of claim 1, wherein said resolving comprises deriving an encryption key based on said input cryptographic information entered via the computing device interface.

9. The method of claim 1, comprising:
converting the two or more input elements to a second version of the two or more input elements for granting access to the protected resource associated with the computing device, wherein said converting comprises mapping the two or more input elements to a unique user via a mapping table so as to identify a version of the two or more input elements for granting access to the protected resource associated with the computing device.

10. An article of manufacture comprising a processor-readable storage medium having processor-readable instructions tangibly embodied thereon which, when implemented, cause a processor to carry out steps comprising:
establishing a pre-determined set of cryptographic information for a computing device, wherein said pre-determined set of cryptographic information comprises two or more input elements and one or more interface input behavior metrics associated with the two or more input elements, wherein the two or more input elements are selected by a user of the computing device, in a given sequence, from a collection of multiple items of non-alpha-numeric data stored on the computing device, and wherein said one or more interface input behavior metrics comprise one or more of (i) touch pressure of input via the computing device interface, (ii) touch angle of input via the computing device interface, (iii) directionality of input via the computing device interface, (iv) a distinct number of iterations of an action in connection with input via the computing device interface, and (v) velocity of input via the computing device interface;
generating a prompt via the computing device interface in connection with an authentication request to access a protected resource associated with the computing device;
processing input cryptographic information entered via the computing device interface in response to the prompt against the pre-determined set of cryptographic information; and
resolving the authentication request based on said processing.

11. An apparatus comprising:
a memory; and
at least one processor coupled to the memory; and
a plurality of modules executing on the at least one processor, wherein the plurality of modules comprise:
a cryptographic information module configured to establish a pre-determined set of cryptographic information for a computing device, wherein said pre-determined set of cryptographic information comprises two or more input elements and one or more interface input behavior metrics associated with the two or more input elements, wherein the two or more input elements are selected by a user of the computing device, in a given sequence, from a collection of multiple items of non-alpha-numeric data stored on the computing device, and wherein said one or more interface input behavior metrics comprise one or more of (i) touch pressure of input via the computing device interface, (ii) touch angle of input via the computing device interface, (iii) directionality of input via the computing device interface, (iv) a distinct number of iterations of an action in connection with input via the computing device interface, and (v) velocity of input via the computing device interface;
an interface module configured to generate a prompt via the computing device interface in connection with an authentication request to access a protected resource associated with the computing device;
an authentication module configured to process input cryptographic information entered via the computing device interface in response to the prompt against the pre-determined set of cryptographic information; and
a processing module configured to resolving the authentication request based on said processing.

12. A method comprising:
generating each of multiple input elements to be associated with a computing device in response to user activity in connection with the computing device, wherein said generating each of the multiple input elements comprises fetching each of the multiple input elements from a collection of non-alpha-numeric data stored on the computing device;
displaying the multiple generated input elements via an interface of the computing device;
determining one or more input modality parameters associated with the multiple generated input elements, wherein said one or more input modality parameters comprise one or more of (i) touch pressure of input via the computing device interface, (ii) touch angle of input via the computing device interface, (iii) directionality of input via the computing device interface, (iv) a distinct number of iterations of an action in connection with input via the computing device interface, and (v) velocity of input via the computing device interface;
generating a prompt via the computing device interface; and
processing input cryptographic information entered via the computing device interface in response to the prompt against the multiple generated input elements and the one or more input modality parameters, wherein said processing comprises:
establishing the multiple generated input elements and the one or more input modality parameters as a pre-determined set of cryptographic information to be used in connection with an authentication request to access a protected resource associated with the computing device if the input cryptographic information matches the multiple generated input elements and the one or more input modality parameters.

13. The method of claim 12, wherein said generating each of the multiple input elements comprises utilizing an accelerometer associated with the computing device.

14. The method of claim 12, wherein said generating each of the multiple input elements further comprises identifying each of the multiple input elements within a database of the computing device based on user selection.

15. The method of claim 12, wherein said determining the one or more input modality parameters comprises prompting a user to select the one or more input modality parameters.

16. The method of claim 1, wherein said resolving comprises denying access to the protected resource associated with the computing device if the input cryptographic information does not match the pre-determined set of cryptographic information.

17. The method of claim 12, wherein said input elements comprise at least one of a character, a symbol, an image, a picture, a photograph, a color, a shape, a shaded shape, and a combination thereof.

18. The method of claim 12, wherein said computing device interface comprises a virtual combination lock.

19. The article of manufacture of claim 10, wherein said two or more input elements comprise at least one of a character, a symbol, an image, a picture, a photograph, a color, a shape, a shaded shape, and a combination thereof.

20. The apparatus of claim 11, wherein said two or more input elements comprise at least one of a character, a symbol, an image, a picture, a photograph, a color, a shape, a shaded shape, and a combination thereof.

\* \* \* \* \*